(12) United States Patent
Harriman et al.

(10) Patent No.: US 8,558,522 B2
(45) Date of Patent: Oct. 15, 2013

(54) METHOD FOR SCALING A DRIVE SIGNAL AND CIRCUIT THEREFOR

(75) Inventors: Paul J. Harriman, Belfair, WA (US); Michael A. Stapleton, Scottsdale, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 292 days.

(21) Appl. No.: 12/972,436

(22) Filed: Dec. 18, 2010

(65) Prior Publication Data
US 2012/0153906 A1    Jun. 21, 2012

(51) Int. Cl.
*G05F 1/00*      (2006.01)

(52) U.S. Cl.
USPC .......................... 323/271; 323/282

(58) Field of Classification Search
USPC ................. 323/284, 285, 222–225, 271–275, 323/282–283
See application file for complete search history.

(56) References Cited

U.S. PATENT DOCUMENTS

| | | | | |
|---|---|---|---|---|
| 6,373,734 B1 * | 4/2002 | Martinelli | ...................... | 363/89 |
| 6,937,488 B2 * | 8/2005 | Eguchi | ............................. | 363/97 |
| 7,015,680 B2 * | 3/2006 | Moraveji et al. | ............... | 323/274 |
| 7,145,316 B1 * | 12/2006 | Galinski, III | .................. | 323/288 |
| 7,482,791 B2 * | 1/2009 | Stoichita et al. | ............... | 323/271 |
| 7,615,940 B2 * | 11/2009 | Qiu et al. | ....................... | 315/308 |
| 7,847,531 B2 | 12/2010 | Qiu et al. | | |
| 7,884,583 B2 * | 2/2011 | Lenz et al. | ..................... | 323/222 |
| 7,990,127 B2 * | 8/2011 | Saint-Pierre | ................... | 323/285 |
| 8,040,708 B2 * | 10/2011 | Sato et al. | ...................... | 363/147 |
| 8,188,721 B2 * | 5/2012 | Isham et al. | ................... | 323/282 |
| 8,294,444 B2 * | 10/2012 | Chen | .............................. | 323/282 |
| 2005/0093528 A1 * | 5/2005 | Yang et al. | ..................... | 323/285 |
| 2008/0278128 A1 * | 11/2008 | Nagase | .......................... | 323/282 |
| 2008/0284398 A1 * | 11/2008 | Qiu et al. | ....................... | 323/283 |
| 2010/0127683 A1 * | 5/2010 | Uno et al. | ...................... | 323/282 |
| 2010/0253306 A1 * | 10/2010 | Shiraishi et al. | .............. | 323/282 |
| 2010/0283440 A1 * | 11/2010 | Futamura | ....................... | 323/282 |
| 2011/0133711 A1 * | 6/2011 | Murakami et al. | ............. | 323/282 |
| 2012/0049829 A1 * | 3/2012 | Murakami | ..................... | 323/288 |

* cited by examiner

*Primary Examiner* — Timothy J Dole
*Assistant Examiner* — Yusef Ahmed
(74) *Attorney, Agent, or Firm* — Rennie William Dover

(57) ABSTRACT

In accordance with an embodiment, a converter includes a circuit and method for scaling a drive signal. The converter determines the power at its input and scales a drive signal in accordance with the input power. In accordance with another embodiment the converter determines the power at its output and scales the drive signal in accordance with the output power.

20 Claims, 2 Drawing Sheets

100

US 8,558,522 B2

METHOD FOR SCALING A DRIVE SIGNAL AND CIRCUIT THEREFOR

BACKGROUND

The present invention relates, in general, to electronics and, more particularly, to methods of forming semiconductor devices and structure.

In the past, the semiconductor industry used power supplies that maintained a constant Direct Current (DC) output voltage even though the load current or the input voltage may have changed. For switching power supplies, this has led to switching and efficiency losses when operating at low and high load currents. Circuitry for improving the efficiencies under different current loads have been disclosed in U.S. Pat. No. 7,615,940 B2 issued to Weihong Qiu et al. on Nov. 10, 2009, and in U.S. Pat. No. 7,847,531 B2 issued to Weihong Qiu et al. on Dec. 7, 2010. A drawback with these techniques is that they only consider one aspect of the inefficiencies.

Accordingly, it would be advantageous to have a method and circuit that enables scaling a drive signal. It would be of further advantage for the method and circuit to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
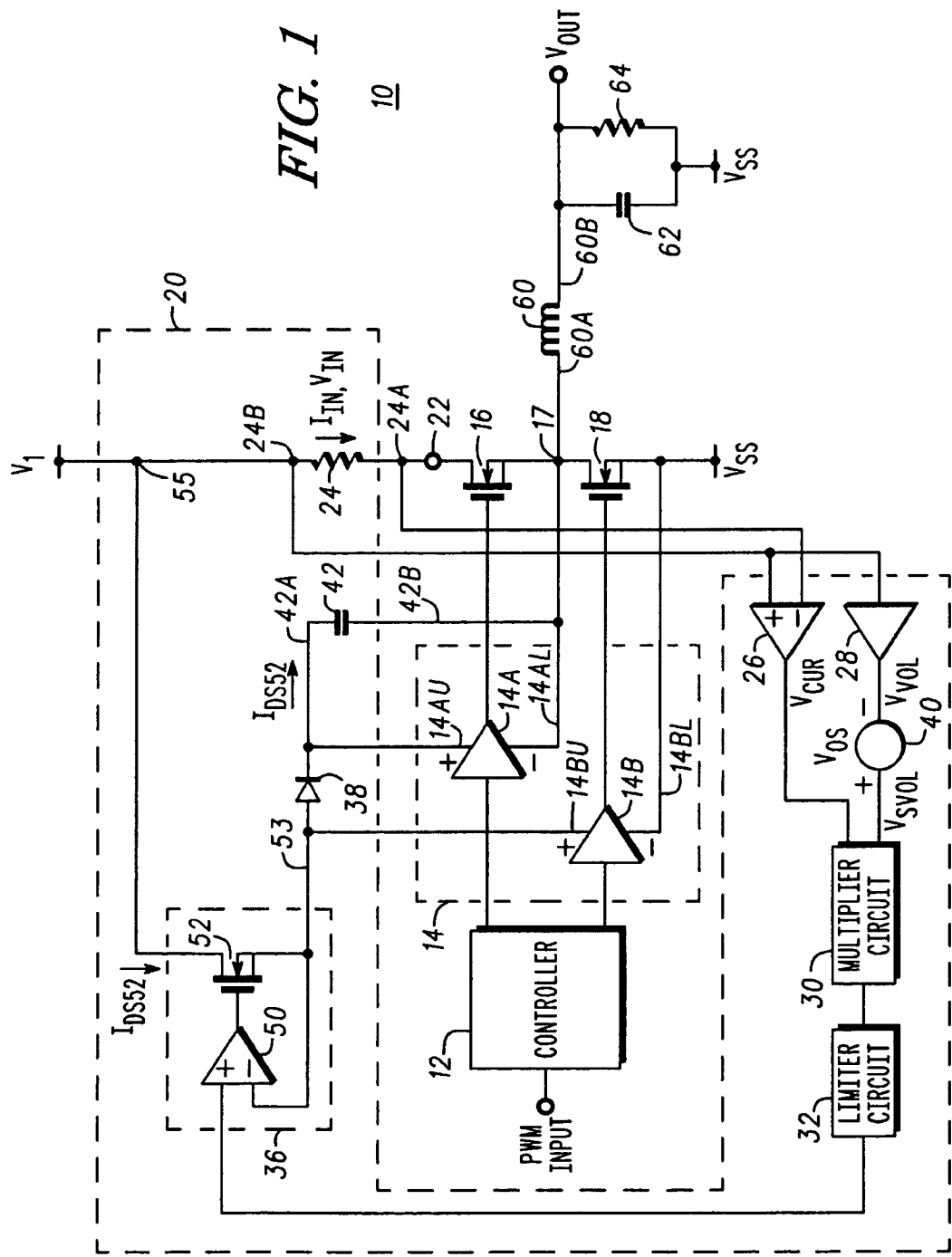
FIG. 1 is a circuit schematic of a converter in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Translator-Translator Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally, the present invention provides a method for scaling a drive signal and a converter for scaling the drive signal. In accordance with an embodiment, a converter circuit having gate drive circuitry suitable for driving power transistors is provided. The supply voltage to the gate drive circuitry is scaled or adjusted in accordance with the power at the input of the converter. In response to a heavy load and in accordance with the power at the input of the converter the gate drive voltage is increased and in response to a light load and in accordance with the input power of the converter the gate drive voltage is decreased.

FIG. 1 is a circuit schematic of a DC to DC converter 10 in accordance with an embodiment of the present invention. DC to DC converter 10 includes a controller 12 coupled to a drive circuit 14 which drives switching devices 16 and 18. Drive circuit 14 has upper supply terminals 14AU and 14BU coupled for receiving operating power from a voltage scaling circuit 20. More particularly, drive circuit 14 includes driver devices 14A and 14B, where driver device 14A drives switching device 16, driver device 14B drives switching device 18, and each driver device 14A and 14B receives a control signal from controller 12. Switching devices 16 and 18 may be field effect transistors such as, for example, Metal Oxide Semiconductor Field Effect Transistors (MOSFETs), bipolar junction transistors, junction field effect transistors, or the like, where each device has a control conductor and current carrying conductors. In accordance with an embodiment in which switching devices 16 and 18 are power MOSFETs, the control conductor is a gate electrode or terminal, one of the current carrying conductors is a drain electrode or terminal, and the other current carrying conductor is a source electrode or terminal. Thus, an output terminal of driver device 14A is connected to the gate terminal of power MOSFET 16 and an output terminal of driver device 14B is connected to the gate terminal of power MOSFET 18. The drain terminal of power MOSFET 16 is connected to an output terminal 22 of voltage scaling circuit 20 and the source terminal of power MOSFET 16 is connected to the drain terminal of power MOSFET 18 to form a switching node 17. Lower supply terminal 14AL of switching device 14A is connected to switching node 17. The source terminal of power MOSFET 18 is coupled for receiving a source of operating potential such as, for example, $V_{SS}$. Operating potential $V_{SS}$ may be, for example, a ground potential. An inductor 60 has a terminal 60A connected to switching node 17 and a terminal 60B. A load capacitor 62 is coupled in parallel with a load resistor between terminal 60B of inductor 60 and source of operating potential $V_{SS}$.

In accordance with an embodiment, scaling circuit 20 comprises a resistor 24, buffer amplifiers 26 and 28, multiplier 30, a limiter 32, a voltage follower 36, and a diode 38. Optionally, scaling circuit 20 may include an offset voltage 40 and a filter capacitor 42. It should be noted that controller 12, drive circuit 14, and scaling circuit 20 may be monolithically integrated into the same semiconductor material. Buffer amplifier 26 has an inverting input terminal, a noninverting input terminal and an output terminal and buffer amplifier 28 has an input terminal and an output terminal. Resistor 24 has a terminal 24A connected to the inverting input terminal of buffer amplifier 26 and a terminal 24B connected to the noninverting input terminal of buffer amplifier 26. The connection of the inverting input terminal of buffer amplifier 26 and terminal 24A of resistor 24 form output terminal 22 of scaling circuit 20. The input terminal of buffer amplifier 28 is connected to the noninverting input terminal of buffer amplifier 26 and to terminal 24B of resistor 24.

Multiplier 30 has an input terminal connected to the output terminal of buffer amplifier 26 and an input terminal connected to the output terminal of buffer amplifier 28 through a voltage source 40, which voltage source 40 provides an offset in response to output voltage $V_{OUT}$ being zero. Voltage source 40 is an optional element. Limiter circuit 32 has an input terminal connected to the output terminal of multiplier 30 and an output terminal connected to an input terminal of voltage follower 36. It should be noted that limiter circuit 32 can introduce an offset voltage in the event that the product of multiplier 30 is zero. Because limiter circuit 32 can introduce the offset voltage, voltage source 40 can be optional.

Voltage follower 36 comprises an operational amplifier 50 connected to a field effect transistor 52. Operational amplifier 50 has a noninverting input terminal, an inverting input terminal and an output terminal, and field effect transistor 52 has a control electrode and current carrying electrodes. As discussed above, the control electrode may be referred to as a gate terminal, a gate electrode, or a gate conductor; one of the current carrying electrodes may be referred to as a drain terminal, a drain electrode, or a drain conductor; and the other current carrying electrode may be referred to as a source terminal, a source electrode, or a source conductor. The noninverting input terminal of operational amplifier 50 is connected to the output terminal of limiter 32 and the inverting input terminal is connected to the source terminal of field effect transistor 52. The gate terminal of field effect transistor 52 is connected to the output terminal of operational amplifier 50 and the drain terminal of field effect transistor 52 is connected to an input node 55, which node 55 is coupled for receiving a potential $V_1$. It should be noted that potential $V_1$ can be a system input voltage or a source of operating potential such as, for example, $V_{CC}$. Connecting the inverting input terminal of operational amplifier 50 to the source terminal of field effect transistor 52 forms an output terminal 53. Output terminal 53 is connected to an upper supply terminal 14BU of driver device 14B and through diode 38 to the upper supply terminal 14AU of driver device 14A and to a terminal 42A of capacitor 42. More particularly, an anode terminal of diode 38 is connected to terminal 53 and the cathode terminal of diode 38 is connected to an upper supply terminal 14AU of driver device 14A and to a terminal 42A of capacitor 42. Lower supply terminal 14AL of driver device 14A and terminal 42B of capacitor 42 are connected to switching node 17. Lower supply terminal 14BL of driver device 14B is connected to the source terminal of power FET 18.

In operation, the drive voltages provided by driver devices 14A and 14B to power MOSFETs 16 and 18 are scaled or adjusted in accordance with the input power or the output power dissipated by converter 10. Thus, the drive voltages applied to the gate terminals of power MOSFETs 16 and 18 are varied in accordance with the input power of converter 10 or the load level and the converter output power. It is desirable to operate power MOSFETs 16 and 18 such that they have the lowest Rdson achievable to improve device reliability and to reduce the total system power dissipation at a light load using the gate drive voltage. Rdson is a function of current flowing in power MOSFETs 16 and 18 which varies in accordance with the load connected to converter 10. In response to a high load, a high gate driver voltage lowers Rdson, but in response to a light load the conduction losses due to Rdson are not significant, instead the gate drive losses become the dominant loss. Accordingly, at light load the gate driver voltage is lowered to decrease the current used to charge the gate capacitance and thus improve the total system power dissipation. By way of example, a load that results in a load current of less than 5 amperes may be considered a light load and a load that results in a load current greater than 10 amperes may be considered a heavy load. A higher gate drive voltage may be used to achieve a lower Rdson under a heavy load than is used to achieve a comparable Rdson under a light load. Converter 10 includes scaling circuit 20 which varies the gate drive voltages in accordance with the input or output power levels, thereby improving the efficiency of converter 10.

For example, a light load may be coupled to converter 10 and driver device 14A may receive a control signal from controller 12 to turn off power MOSFET 16 and driver device 14B may receive a control signal from controller 12 to turn on power MOSFET 18. Buffer amplifier 26 generates an output signal $V_{CUR}$ in response to the signal at its input terminals and buffer amplifier 28 generates an output signal $V_{VOL}$ in response to the signal at its input terminal. Output signal $V_{CUR}$ is a representative voltage signal or a sensed current signal that is generated in response to the input current to the converter 10 and output signal $V_{VOL}$ is a sensed voltage signal that is generated in response to the voltage at the input of converter 10. Voltage signals $V_{CUR}$, $V_{VOL}$, and $V_{SVOL}$ may be referred to as buffered voltage signals. Output signal $V_{VOL}$ is shifted by offset voltage $V_{OS}$ to generate a shifted voltage $V_{SVOL}$. Although voltage $V_{SVOL}$ is a shifted value of voltage $V_{VOL}$, it still represents a sensed voltage signal that is generated in response to the voltage at the input of converter 10. A product signal. $P_{INL}$ of output signal $V_{CUR}$ and shifted voltage signal $V_{SVOL}$ is generated by multiplier circuit 30 and is representative of the input power of converter 10 when power MOSFET 18 is on and power MOSFET 16 is off. If power signal $P_{INL}$ is outside of a specified operating window of voltage follower 36, limiter circuit 32 limits or clips the product signal to place it within the specified operating window and transmits the voltage signal to the noninverting input terminal of operational amplifier 50. Thus, limiter circuit 32 produces a limited product signal.

Because operational amplifier 50 is configured as a voltage follower, the voltage at its noninverting input terminal appears at its inverting input terminal and thus at node 53. The voltage that appears at node 53 serves as a scaling signal. When the load is light, the feedback loop maintains the voltage at node 53, and therefore the voltages at input terminals 14AL and 14AU at a level sufficient to drive power MOSFETs 16 and 18 while maintaining a sufficiently low Rdson to minimize the total power losses of converter 10. It should be noted that when power MOSFET 18 is on, the voltage at node 17 is approximately equal to operating potential $V_{SS}$ and that the drain-to-source current $I_{DS52}$ of transistor 52 flows through node 53, diode 38, into node 17, and to ground through power MOSFET 18. Current $I_{DS52}$ charges capacitor 42 so that it can serve as a supply voltage for high side driver device 14A.

In response to a control signal from controller 14 turning on power MOSFET 16 and turning off power MOSFET 18, the voltage at node 17 increases and causes a voltage $V_{SUM}$ to appear at input terminal 14AU of driver device 14A. Voltage $V_{SUM}$ is substantially equal to the sum of the voltage at node 17 and the voltage across capacitor 42 and serves as the supply voltage for driver device 14A. Capacitor 42 in combination with the voltage at node 17 form a floating power supply for driver device 14A and enable driver device 14A to drive power FET 16. Diode 38 inhibits capacitor 42 from discharging back into the regulated driver supply as the voltage on node 17 rises. Like the operation in response to power MOSFET 18 being on and power MOSFET 16 being off, buffer amplifier 26 generates an output signal $V_{CUR}$ in response to the signal at its input terminals and buffer amplifier 28 generates an output signal $V_{VOL}$ in response to the signal at its input terminal. Output signal $V_{VOL}$ is shifted by offset voltage $V_{OS}$ to generate a shifted voltage $V_{SVOL}$. A product $P_{INL}$ of output signal $V_{CUR}$ and shifted voltage signal $V_{SVOL}$ is generated by multiplier circuit 30 that is representative of the input power of converter 10 when power MOSFET 18 is off and power MOSFET 16 is on. If power signal $P_{INL}$ is outside of a specified operating window of voltage follower 36, limiter circuit 32 limits or clips the signal to place it within the specified operating window and transmits the voltage signal to the noninverting input terminal of operational amplifier 50, wherein the voltage serves as a scaling signal.

Because operational amplifier 50 is configured as a voltage follower, the voltage at its noninverting input terminal appears at its inverting input terminal and thus at node 53. In response to a light load, the feedback loop minimizes the voltage at node 53, and therefore the voltages at input terminals 14AL and 14AU, at a level sufficient to drive power MOSFETs 16 and 18 while maintaining a sufficiently low Rdson to minimize the total losses of converter 10. Changing the voltages at input terminals 14AL and 14AU scales or adjusts the gate drive signal to the gate of power MOSFETs 16 and 18. In response to power MOSFET 16 switching on and power MOSFET 18 switching off, the voltage at node 17 and the voltage at input terminal 14AU increase. The voltage at input terminal 14AU increases to a voltage $V_{SUM}$, where voltage $V_{SUM}$ is substantially equal to the sum of the voltage at node 17 and the voltage across capacitor 42. Thus, voltage $V_{SUM}$ serves as the supply voltage for driver device 14A. Capacitor 42 in combination with the voltage at node 17 form a floating power supply for driver device 14A enabling driver device 14A to drive power MOSFET 16 in response to power MOSFET 16 turning on. Changing the supply voltage of driver device 14A scales the gate drive signal to the gate of power MOSFET 16. Diode 38 inhibits capacitor 42 from discharging back into the regulated driver supply as the voltage on node 17 rises.

In response to a heavy load coupled to converter 10, driver device 14A may receive a control signal from controller 12 to turn off power MOSFET 16 and driver device 14B may receive a control signal from controller 12 to turn on power MOSFET 18. Buffer amplifier 26 generates an output signal $V_{CUR}$ in response to the signal at its input terminals and buffer amplifier 28 generates an output signal $V_{VOL}$ in response to the signal at its input terminal. Output signal $V_{VOL}$ is shifted by offset voltage $V_{OS}$ to generate a shifted voltage $V_{SVOL}$. A product signal $P_{INL}$ of output signal $V_{CUR}$ and shifted voltage signal $V_{SVOL}$ is generated by multiplier circuit 30 and is representative of the input power of converter 10 when power MOSFET 18 is on and power MOSFET 16 is off. If product signal $P_{INL}$ is outside of a specified operating window of voltage follower 36, limiter circuit 32 limits or clips the signal to place it within the specified operating window and transmits the voltage signal to the noninverting input terminal of operational amplifier 50. Thus, limiter circuit 32 produces a limited product signal.

Because operational amplifier 50 is configured as a voltage follower, the voltage at its noninverting input terminal appears at its inverting input terminal and thus at node 53. The voltage that appears at node 53 serves as a scaling signal. It should be noted that the voltage at node 17 is approximately equal to supply voltage $V_{SS}$ and that a drain-to-source current $I_{DS52}$ of transistor 52 flows through node 53, diode 38, into node 17, and to ground through power MOSFET 18. Current $I_{DS52}$ charges capacitor 42 so that it can serve as the supply voltage for the high side driver device 14A.

In response to a control signal from controller 14 turning on power MOSFET 16 and turning off power MOSFET 18, the voltage at node 17 increases and causes a voltage $V_{SUM}$ to appear at input terminal 14AU of driver device 14A. Voltage $V_{SUM}$ is substantially equal to the sum of the voltage at node 17 and the voltage across capacitor 42 and serves as the supply voltage for driver device 14A. Capacitor 42 in combination with the voltage at node 17 form a floating power supply for driver device 14A and enable driver device 14A to drive power FET 16. Diode 38 inhibits capacitor 42 from discharging back into the regulated driver supply as the voltage on node 17 rises. Like the operation in response to power MOSFET 18 being on and power MOSFET 16 being off, buffer amplifier 26 generates an output signal $V_{CUR}$ in response to the signal at its input terminals, and buffer amplifier 28 generates an output signal $V_{VOL}$ in response to the signal at its input terminal. Output signal $V_{VOL}$ is shifted by offset voltage $V_{OS}$ to generate a shifted voltage $V_{SVOL}$. A product $P_{INL}$ of output signal $V_{CUR}$ and shifted voltage signal $V_{SVOL}$ is generated by multiplier circuit 30 and is representative of the input power of converter 10 when power MOSFET 18 is off and power MOSFET 16 is on. If power signal $P_{INL}$ is outside of a specified operating window of voltage follower 36, limiter circuit 32 limits or clips the signal to place it within the specified operating window and transmits the voltage signal to the noninverting input terminal of operational amplifier 50.

Because operational amplifier 50 is configured as a voltage follower, the voltage at its noninverting input terminal appears at its inverting input terminal and thus at node 53. The voltage that appears at node 53 serves as a scaling signal. When power MOSFET 18 is off and power MOSFET 16 is on, the feedback loop maintains the voltage at node 53, and therefore the voltages at input terminals 14AL and 14AU, at a level sufficient to drive power MOSFETs 16 and 18 while maintaining a low Rdson. Changing the voltages at input terminals 14AL and 14AU scales or adjusts the gate drive signal to the gate of power MOSFETs 16 and 18. In response to power MOSFET 16 switching on and power MOSFET 18 switching off, the voltage at node 17 and the voltage at input terminal 14AU increase. The voltage at input terminal 14AU increases to a voltage $V_{SUM}$, where voltage $V_{SUM}$ is substantially equal to the sum of the voltage at node 17 and the voltage across capacitor 42. Thus, voltage $V_{SUM}$ serves as the supply voltage for driver device 14A. Capacitor 42 in combination with the voltage at node 17 form a floating power supply for driver device 14A and enable driver device 14A to drive power MOSFET 16 in response to MOSFET 16 turning on. Diode 38 inhibits capacitor 42 from discharging back into the regulated driver supply as the voltage on node 17 rises.

It should be noted that scaling circuit 20 may be responsive to a digital control signal, i.e., controller 12 may be a digital controller or a controller that outputs one or more digital control signals.

Figure 2:
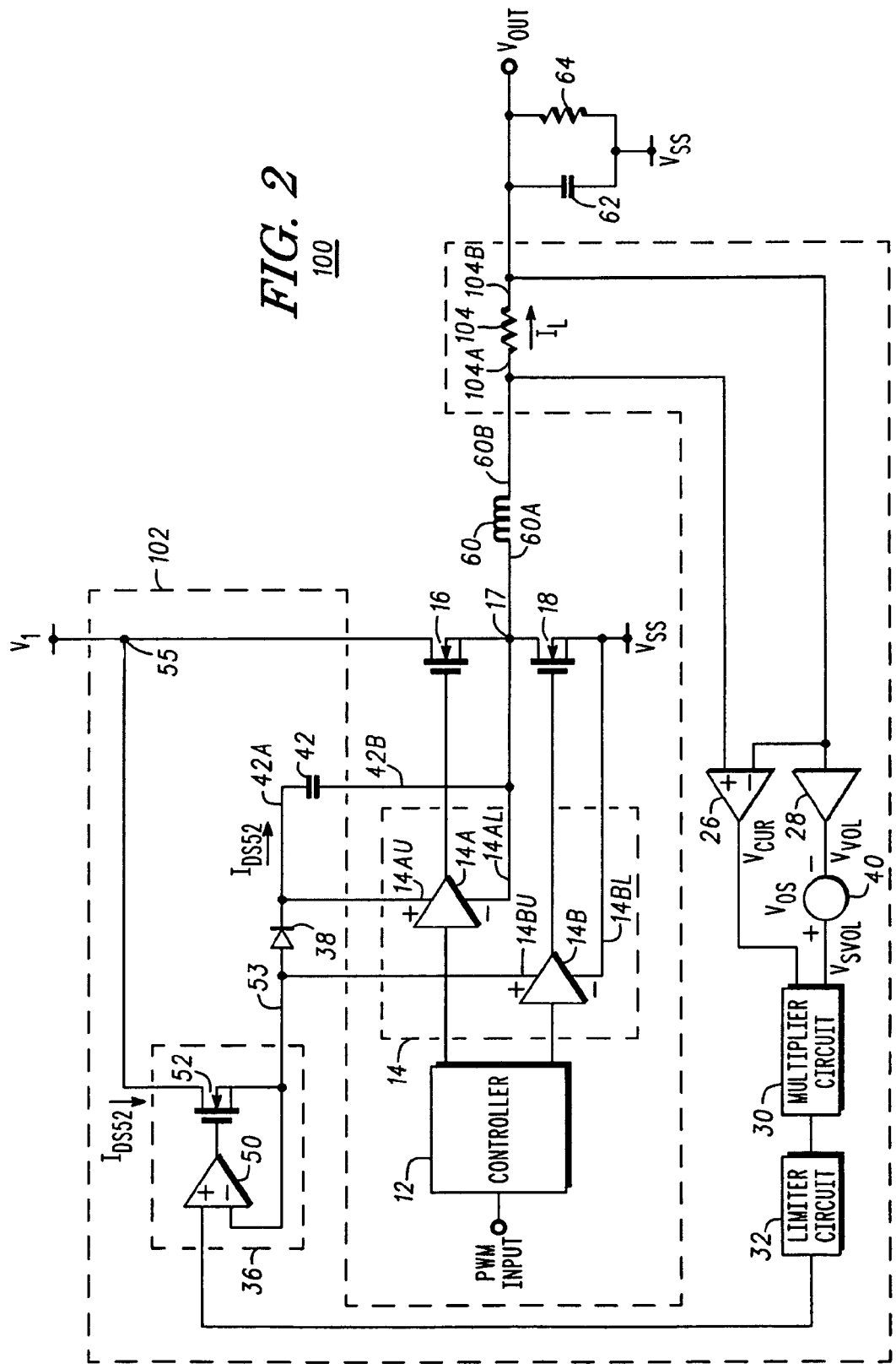
FIG. 2 is circuit schematic of a converter in accordance with an embodiment of the present invention.

FIG. 2 is a circuit schematic of a DC to DC converter 100 in accordance with an embodiment of the present invention. Like DC to DC converter 10, converter 100 includes a controller 12 coupled to a drive circuit 14 that drives switching devices 16 and 18. Drive circuit 14 has upper supply terminals 14AU and 14BU coupled for receiving operating power from a voltage scaling circuit 102. More particularly, drive circuit 14 includes driver devices 14A and 14B, where driver device 14A drives switching device 16, driver device 14B drives switching device 18, and each driver device 14A and 14B receives a control signal from controller 12. Switching devices 16 and 18 may be field effect transistors such as, for example, MOSFETs, bipolar junction transistors, junction field effect transistors, or the like, where each has a control conductor and current carrying conductors. In accordance with an embodiment in which switching devices 16 and 18 are power MOSFETs, the control conductor is a gate electrode or terminal, one of the current carrying conductors is a drain electrode or terminal, and the other current carrying conductor is a source electrode or terminal. Thus, an output terminal of driver device 14A is connected to the gate terminal of power MOSFET 16 and an output terminal of driver device 14B is connected to the gate terminal of power MOSFET 18. The drain terminal of power MOSFET 16 is connected to an output terminal 22 of voltage scaling circuit 102 and the source terminal of power MOSFET 16 is connected to the drain terminal of power MOSFET 18 to form a switching node 17. Lower supply terminal 14AL of switching device 14A is connected to switching node 17. The source terminal of power MOSFET 18 is coupled for receiving a source of operating potential such as, for example, $V_{SS}$. Operating potential $V_{SS}$ may be, for example, ground potential. An inductor 60 has a terminal 60A connected to switching node 17 and a terminal 60B. A load capacitor 62 is coupled in parallel with a load resistor between terminal 60B of inductor 60 and source of operating potential $V_{SS}$.

In accordance with an embodiment, scaling circuit 102 comprises a resistor 104, buffer amplifiers 26 and 28, multiplier 30, a limiter 32, a voltage follower 36, and a diode 38. Optionally, scaling circuit 102 may include an offset voltage 40 and a filter capacitor 42. It should be noted that controller 12, drive circuit 14, and scaling circuit 102 may be monolithically integrated into the same semiconductor material. The configuration of buffer amplifiers 26 and 28, multiplier 30, limiter 32, voltage follower 36, diode 38, and capacitor 42 have been described with reference to FIG. 1. DC to DC converter 100 differs from DC to DC converter 10 in that resistor 24 is absent from DC to DC converter 100 and resistor 104 is connected between terminal 60B of inductor 60 and the parallel combination of capacitor 62 and resistor 64. Thus, resistor 104 has a terminal 104A connected to the inverting input terminal of buffer amplifier 26 and a terminal 104B connected to the noninverting input terminal of buffer amplifier 26. The input terminal of buffer amplifier 28 is connected to the noninverting input terminal of buffer amplifier 26 and to terminal 104B of resistor 104. Like scaling circuit 20, scaling circuit 102 may be responsive to a digital control signal.

The operation of DC to DC converter 100 is similar to that of DC to DC converter 10 except that DC to DC converter 100 monitors and adjusts the drive voltages in accordance with the output power rather than the input power, which is a product of the load current $I_L$ and voltage $V_{OUT}$. Thus, resistor 104 rather than resistor 24 is coupled across the input terminals of amplifier 26 and voltage $V_{OUT}$ is coupled to the input of amplifier 28 rather than voltage $V_1$. With this change, the operation of DC to DC converter 100 is similar to that of DC to DC converter 10.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for scaling a drive signal suitable for use in a power supply, comprising:
 providing a converter having an input and an output;
 determining an input power or an output power of the converter; and
 scaling a supply signal of a drive circuit in the converter in response to the input power or the output power to generate a scaled supply signal, the drive circuit comprising a first driver device having first and second supply terminals and a second driver device having first and second terminals, the scaled supply signal coupled to the first supply terminal of the first driver device and to the first supply terminal of the second driver device.

2. The method of claim 1, wherein determining the input power or the output power of the converter includes determining the input power of the converter and wherein scaling the supply signal comprises scaling the drive signal in response to the input power.

3. The method of claim 2, wherein determining the input power of the converter comprises:
 generating a sensed current signal in response to sensing an input current to the converter;
 generating a sensed voltage signal in response to sensing an input voltage of the converter; and
 multiplying the sensed current signal by the sensed voltage signal to generate a product signal.

4. The method of claim 3, wherein generating the sensed current signal in response to sensing the input current to the converter comprises:
 generating a representative voltage signal in accordance with the input current; and
 amplifying the representative voltage signal to generate a first amplified voltage signal.

5. The method of claim 4, wherein generating the sensed voltage signal in response to sensing the input voltage of the converter comprises:
 amplifying the output voltage signal to generate the sensed voltage signal; and
 adding an offset voltage to the sensed voltage signal.

6. The method of claim 5, further including limiting the product signal to generate a limited product signal.

7. The method of claim 6, further including adjusting a supply voltage of the first and second driver devices in accordance with the limited product signal, the adjusted supply voltage serving as the scaled supply signal.

8. The method of claim 1, wherein determining the input power or the output power of the converter includes determining the output power of the converter and wherein scaling the supply signal comprises scaling the supply signal in response to the output power.

9. The method of claim 8, wherein determining the output power of the converter comprises:
generating a sensed current signal in response to sensing an output current;
generating a sensed voltage signal in response to sensing the output voltage; and
multiplying the sensed current signal by the sensed voltage signal to determine the output power of the converter.

10. The method of claim 1, wherein scaling the supply signal of the drive circuit in the converter in response to the input power or the output power includes scaling a supply voltage of the drive circuit, the supply voltage serving as the supply signal.

11. The method of claim 1, further including scaling the supply signal of the drive circuit in the converter in response to a digital control signal.

12. A method for adjusting a signal, comprising:
providing a converter having an input and an output;
determining power at the input or power at the output of the converter;
generating a scaling signal in accordance with the power at the input or the power at the output of the converter; and
using the scaling signal to adjust a drive signal of a circuit in the converter to generate an adjusted drive signal, the circuit comprising a first driver device having first and second supply terminals and a second driver device having first and second supply terminals, the adjusted drive signal coupled to the first supply terminal of the first driver and to the first supply terminal of the second driver.

13. The method of claim 12, wherein determining the power at the input or the power at the output of the converter comprises:
sensing a voltage across a resistor; and
buffering the voltage sensed across the resistor to generate a first buffered voltage signal.

14. The method of claim 13, wherein determining the power at the input or the power at the output of the converter comprises buffering the output voltage of the converter to generate a second buffered voltage signal.

15. The method of claim 14, further including multiplying the first and second buffered voltage signals together to generate a product signal.

16. The method of claim 15, further including using the product signal to generate the scaling signal.

17. A circuit, comprising:
a drive circuit comprising first and second driver devices, each driver device having first and second supply input terminals and an output terminal;
a scaling circuit having first and second input terminals and an output terminal, the scaling circuit configured to provide a scaled supply signal to the first and second driver devices and the output terminal coupled to the first supply input terminals of the first and second driver devices;
a multiplier circuit having first and second input terminals and an output terminal, the output terminal of the multiplier circuit coupled to the first input terminal of the scaling circuit;
a first buffer circuit having first and second input terminals and an output terminal, the output terminal of the first buffer circuit coupled to the first input terminal of the multiplier circuit;
a second buffer circuit having an input terminal and an output terminal, the output terminal of the second buffer circuit coupled to the second input terminal of the multiplier circuit; and
a resistor having first and second terminals, the first terminal of the resistor coupled to the first input terminal of the first buffer circuit and to the input terminal of the second input circuit, and the second terminal of the resistor coupled to the second input terminal of the first buffer circuit.

18. The circuit of claim 17, wherein the second terminal of the resistor is coupled to a current carrying electrode of a transistor.

19. The circuit of claim 17, further including a source of potential coupled between the output of the second buffer circuit and the second input to the multiplier circuit.

20. The circuit of claim 17, wherein the scaling circuit is responsive to a digital control signal.

* * * * *